(12) United States Patent
Gray

(10) Patent No.: US 7,697,556 B2
(45) Date of Patent: Apr. 13, 2010

(54) MAC (MEDIA ACCESS CONTROL) TUNNELING AND CONTROL AND METHOD

(75) Inventor: Eric Ward Gray, Lee, NH (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 603 days.

(21) Appl. No.: 11/586,777

(22) Filed: Oct. 26, 2006

(65) Prior Publication Data

US 2008/0101386 A1 May 1, 2008

(51) Int. Cl.
*H04L 12/28* (2006.01)
(52) U.S. Cl. .............. 370/419; 370/469; 370/400; 370/389
(58) Field of Classification Search .............. None
See application file for complete search history.

(56) References Cited

U.S. PATENT DOCUMENTS

| 5,949,788 A * | 9/1999 | Friedman et al. ............ 370/431 |
| 2008/0089326 A1 * | 4/2008 | Kotrla et al. ................ 370/389 |

* cited by examiner

*Primary Examiner*—Bob A Phunkulh

(57) ABSTRACT

A telecommunications system includes a first device having a plurality of interfaces, with each interface having a unique MAC address, the first device using the MAC addresses for forwarding frames. The system includes at least one bridge in communication with the first device. The system includes a second device in communication with the first device through the bridge having a plurality of interfaces with each interface having a unique MAC address, the first device forwarding frames to a first interface of the plurality of interfaces of the second device using the unique MAC address of the first interface of the second device. A method for communicating.

9 Claims, 2 Drawing Sheets

MAC (MEDIA ACCESS CONTROL) TUNNELING AND CONTROL AND METHOD

FIELD OF THE INVENTION

The present invention is related to forwarding frames between devices using unique MAC addresses having a plurality of interfaces with each interface having a unique MAC address. More specifically, the present invention is related to forwarding frames between devices using unique MAC addresses having a plurality of interfaces with each interface having a unique MAC address based on far-side MAC addresses.

BACKGROUND OF THE INVENTION

Current technology solutions include 802.1Q (VLAN), IEEE 802.1ah (Provider Back-Bone Bridging) and 802.1D bridging.

These base solutions are notorious for making inefficient use of available links—because of the use of one (or more) variations of STP (Spanning Tree Protocol), which effectively blocks ports (and corresponding links)—making them unusable.

Proposals discussed to date to provide a means of making better use of redundant links include:

MSTP: MSTP makes use of VLAN grouping to derive distinct spanning trees—where one or more VLANs are associated with each spanning tree, ports are "blocked" on a VLAN group basis, and the choice of links that make up a VLAN group spanning tree are pseudo-randomized in an attempt to equalize the distribution of VLAN traffic across links. One problem with this approach is that MSTP does not currently define a means to weight the assignment of VLANs to a group, or the overlap of VLAN groups and all redundant-link choices, on the basis of either expected or observed traffic on each VLAN—consequently, the service quality received by network users is typically influenced by incidental factors used in random selection rather than the service quality they appear to expect.

802.1ah: 802.1ah is an IEEE proposal, for use by service providers, using MAC-in-MAC tunneling for the delivery of traffic on a provider-edge to provider-edge basis. Limitations of this approach include the fact that 802.1ah does not define or describe mechanisms for how the MAC-in-MAC tunnels are defined and configured and—consequently—how distribution of traffic is established and maintained.

PBT: PBT (Provider Backbone Transport) is a Nortel proposal that extends 802.1ah by providing 1) a means and basis for establishing 802.1ah tunnels and 2) methods for establishing and maintaining tunnels to accommodate specific service quality needs. Issues with this approach include the fact that control and forwarding across infrastructure bridges requires all such bridges to support the mechanism.

GELS: GELS (GMPLS [Generalized Multi-Protocol Label Switching] controlled Ethernet Label Switching) is a proposal (brought to the IETF from several sources). It suggests using a GMPLS control-plane to establish the equivalent of the combination of multiple spanning trees and local 802.1Q-like filtering databases. The essential mechanisms discussed to date would use signaling to program forwarding entries at each GELS-compliant GMPLS-controlled Ethernet switch, where both the VLAN tag and the destination MAC are used as keys (in signaling and in forwarding) for creating/finding each forwarding entry. The most important issue with GELS is that it is largely undefined at this point—including, in particular, how the collection of paths is determined prior to signaling (whether by central or distributed computation) and how such a determination impacts provisioning of service quality. A secondary issue is that—at present—it appears that all Ethernet forwarding devices within an Ethernet forwarding domain must be GELS-compliant.

TRILL: TRILL (Transparent Interconnect over Lots of Links) is an IETF proposal that combines 802.1D—as well as 802.1Q—and either IS-IS, or OSPF, routing to determine optimal forwarding paths (independent of any variation of STP) using SPF (Shortest Path First) routing mechanisms. The key objective of this effort is to define a scalable—SPF based—Ethernet forwarding approach for use in large enterprises. Current proposals in this effort focus on minimal configuration, use of Ethernet+ SHIM in Ethernet encapsulation, and forwarding optimization based on link utilization, VLAN and (largely IP[Internet Protocol]-specific) Multicast Group forwarding. As this effort is currently targeted for Enterprise use, proposals do not include (but also do not preclude) use of a signaling or negotiation process to determine path selection on a basis other than SPF routing.

As stated above, MSTP can easily result in (possibly pathologically) inequitable distribution of Ethernet traffic.

802.1ah addresses a broader problem space, allowing—but not proposing—a specific solution to the problem of traffic distribution and service quality.

Both PBT and GELS claim to provide a potential solution to the bandwidth distribution problem—through the use of signaling—but require ubiquitous deployment of the specific solution chosen.

TRILL offers a solution that provides path usage optimization and may be used in an incremental replacement/deployment strategy for large enterprises—but does not directly allow for modification of assignment of traffic to links on the basis of service quality expectations.

As part of the background, 802.1ah is derived from (and includes) 802.1Q—as 802.1Q is derived from (and includes) 802.1D. PBT is an extension, or proposed extension, to 802.1ah. GELS is a related—but different—proposal with respect to 802.1Q and may or may not include 802.1ah as it continues to develop in the IETF. TRILL is intended to extend 802.1Q, in combination with IS-IS.

BRIEF SUMMARY OF THE INVENTION

The present invention extends each of the above proposals through the use of modifications to the IEEE proposal 802.1ah. It retains the characteristic of continuing interoperability with existing Ethernet equipment (similar to TRILL), while offering a mechanism which can provide finer-grained control of traffic distribution.

The present invention pertains to a telecommunications system. The system comprises a first device having a plurality of interfaces, with each interface having a unique MAC address, the first device using the MAC addresses for forwarding frames. The system comprises at least one bridge in communication with the first device. The system comprises a second device in communication with the first device through the bridge having a plurality of interfaces with each interface having a unique MAC address, the first device forwarding frames to a first interface of the plurality of interfaces of the second device using the unique MAC address of the first interface of the second device.

The present invention pertains to a method for communicating. The method comprises the steps of forwarding a frame by a first device having a plurality of interfaces, with each interface having a unique MAC address, to a first interface of a plurality of interfaces of a second device, with each interface having a unique MAC address, using the unique MAC address of the first interface of the second device, the second device in communication with the first device through a bridge. There is the step of receiving the frame at the first interface of the second device.

BRIEF DESCRIPTION OF THE SEVERAL
VIEWS OF THE DRAWING

In the accompanying drawings, the preferred embodiment of the invention and preferred methods of practicing the invention are illustrated in which.

DETAILED DESCRIPTION OF THE INVENTION

Figure 1:
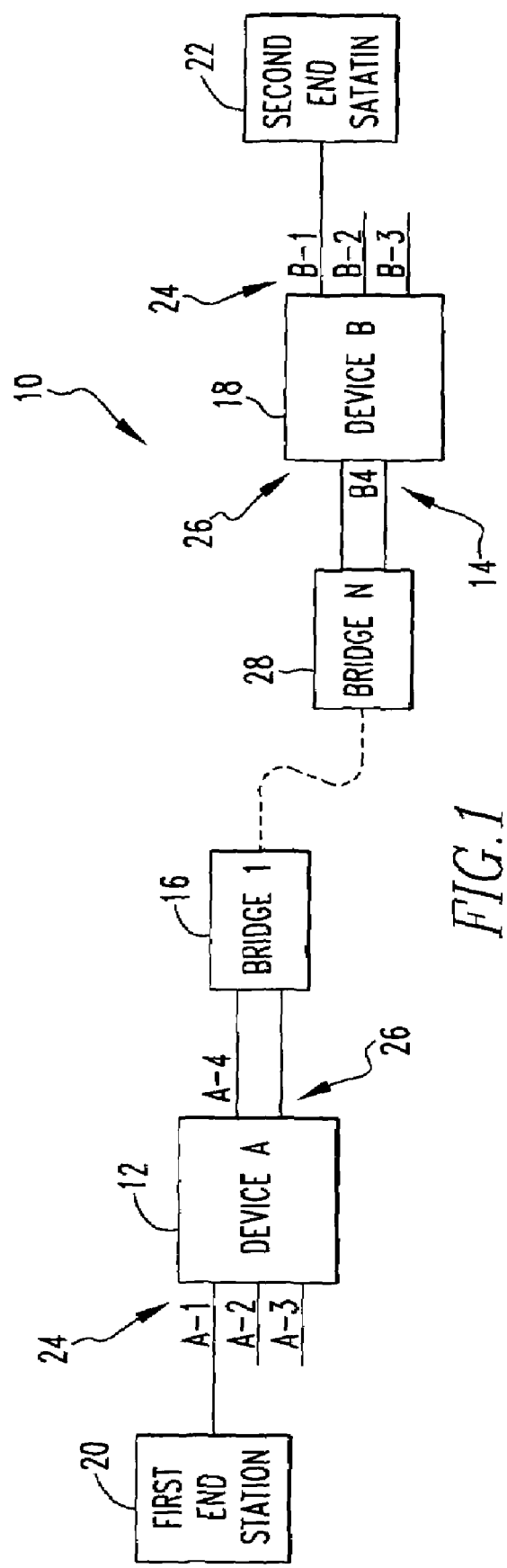
FIG. 1 is a block diagram of the tunneling extension of the present invention.

Referring now to the drawings wherein like reference numerals refer to similar or identical parts throughout the several views, and more specifically to FIG. 1 thereof, there is shown a telecommunications system 10. The system 10 comprises a first device 12 having a plurality of interfaces, with each interface having a unique MAC address, the first device 12 using the MAC addresses for forwarding frames. The system 10 comprises at least one bridge 16 in communication with the first device 12. The system 10 comprises a second device 18 in communication with the first device 12 through the bridge 16 having a plurality of interfaces with each interface having a unique MAC address. The first device 12 forwarding frames to a first interface 14 of the plurality of interfaces of the second device 18 using the unique MAC address of the first interface 14 of the second device 18.

Preferably, the system 10 include a first end station 20 and a second end station 22, and wherein at least a second interface 24 having a unique MAC address of the plurality of interfaces of the first device 12 in communication with the first end station 20, and at least a second interface 24 having a unique MAC address of the plurality of interfaces of the second device 18 in communication with the second end station 22. The system 10 preferably includes a third interface 26 of the plurality of interfaces of the first device 12 in communication with a third interface 26 of the plurality of interfaces of the second device 18 through the bridge 16. Preferably, the first device 12 communicates with the second end station 22 through the second device 18 using the unique MAC address of the second interface 24 of the second device 18.

When the first device 12 receives a frame from the first end station 20 to be forwarded to the second end station 22, the first device 12 preferably encapsulates the frame with the unique MAC address of the second interface 24 of the first device 12 on which the first device 12 received the frame from the first end station 20 and the unique MAC address of the second interface 24 of the second device 18. Preferably, when the second device 18 receives the frame for the second end station 22 from the first device 12, the second device 18 removes the encapsulated MAC address of the first device 12 and forwards the frame through the second interface 24 of the second device 18 to the second end station 22.

The path selection between the first end station 20 and the second end station 22 is preferably based on far-side MAC addresses.

Preferably, the bridge 16 includes intermediate devices 28 and programming of the path selection uses either direct signaling, restricted configuration and consistency negotiation, restricted learning, heuristic and/or algorithmic control applications (centralized or distributed), or TRILL—with the following exceptions:

the tunnel-encapsulation Ethernet destination MAC address would in all cases be the MAC address of the interface on which the frame will be forwarded by the second device 18, both in link-state protocol MAC routing advertisements and in corresponding forwarding entries at each intermediate device 28 of the bridge 16; and where multiple shortest paths exist, the specific path selected will depend on the tunnel-encapsulation destination Ethernet MAC address.

The present invention pertains to a method for communicating. The method comprises the steps of forwarding a frame by a first device 12 having a plurality of interfaces, with each interface having a unique MAC address, to a first interface 14 of a plurality of interfaces of a second device 18, with each interface having a unique MAC address, using the unique MAC address of the first interface 14 of the second device 18, the second device 18 in communication with the first device 12 through a bridge 16. There is the step of receiving the frame at the first interface 14 of the second device 18.

Preferably, there is the step of receiving the frame from a first end station 20 at a second interface 24 having a unique MAC address of the plurality of interfaces of the first device 12 in communication with the first end station 20. There is preferably the step of receiving the frame at a second end station 22 through a second interface 24 having a unique MAC address of the plurality of interfaces of the second device 18 in communication with the second end station 22. Preferably, there is the step of sending the frame by the first device 12 to the second destination through the bridge 16 using the unique MAC address of the second interface 24 of the second device 18.

Before the sending step, there is preferably the step of encapsulating by the first device 12 the frame with the unique MAC address of the second interface 24 of the first device 12 on which the first device 12 received the frame from the first end station 20 and the unique MAC address of the second interface 24 of the second device 18 after the first device 12 receives the frame from the first end station 20 to be forwarded to the second end station 22. Preferably, after the step of receiving the frame at the second end station 22, there are the steps of removing by the second device 18 the encapsulated MAC address of the first device 12 and forwarding the frame through the second interface 24 of the second device 18 to the second end station 22. Before the encapsulating step, there is preferably the step of selecting a path between the first end station 20 and the second end station 22 is based on far-side MAC addresses.

Preferably, the bridge 16 includes intermediate devices 28 and including the step of programming of the path selection uses either direct signaling, restricted configuration and consistency negotiation, restricted learning, heuristic and/or algorithmic control applications (centralized or distributed), or TRILL—with the following exceptions:

the tunnel-encapsulation Ethernet destination MAC address would in all cases be the MAC address of the interface on which the frame will be forwarded by the second device 18, both in link-state protocol MAC routing advertisements and in corresponding forwarding entries at each intermediate device 28 of the bridge 16; and where multiple shortest paths exist, the specific path selected will depend on the tunnel-encapsulation destination Ethernet MAC address.

In the system 10, a signaling protocol is used between devices having similar capabilities. Any signaling protocol—which provides for a reliable delivery mechanism—might be used. However, for simplicity, this description assumes use of a TCP-based signaling protocol similar to LDP. The signaling protocol is used to discover "cooperating" devices, reliably maintain MAC-layer reachability information and communicate information to be used in a modified MAC-in-MAC encapsulation.

Further, the system 10 extends 802.1ah, incorporated by reference herein, by assuming that devices will have been built—or configured—with unique MAC-layer addresses for each participating interface, and that the MAC address used in signaling MAC-in-MAC encapsulation for use in forwarding toward a specific interface of the local device is the unique MAC-layer address of that interface.

As an example, see FIG. 1.

FIG. 1 shows two devices (Device A and Device B) connected by an arbitrary number of bridges 16. As a generalization, Devices A and B could be connected by a single bridge 16, or could be directly connected to each other. In addition, there may be any arbitrary number of Devices that are thus connected to each other.

Each Device has 4 interfaces in FIG. 1, with 1 interface on each Device being used to connect the two devices—however indirectly—and 3 additional interfaces used to connect to any arbitrary number of end stations. Again, as a generalization, there may be any arbitrary number of 1 or more interfaces on each Device connecting it to other Devices, there may be any arbitrary number of 0 (zero) or more interfaces connecting to any arbitrary number of MAC-layer end stations or there may be any arbitrary mix of interfaces that both connect a Device to other Devices as well as to any arbitrary number of end stations.

In existing usage (particularly 802.1ah), forwarding is based on a somewhat modified bridge model—with MAC-in-MAC encapsulation based on a single interface MAC-layer address, or that of the one MAC-layer interface which connects the two Devices (the address of the receiver of a sender-receiver pair). In the system 10, the MAC-layer address that is signaled, and used in forwarding, is the one for the interface over which the encapsulated frame will be forwarded, once a receiving Device receives the encapsulated frame and removes the MAC-in-MAC encapsulation.

As a specific example, Device B may discover (by any of several existing means) that a MAC-layer entity "X" exists off of its interface "B-1." It signals to Device A that "X" is reachable using a MAC layer destination (in MAC-in-MAC tunneling encapsulation) for interface "B-1."

Note—in signaling this information—the signaling message must use the same MAC-layer address (corresponding to "B-1") as the "source" address for the frame it sends to Device A. This is required—at least initially—to ensure that Bridges 16 (Bridge 1 through Bridge N) learn how to forward frames toward Device B when the MAC-layer destination address is "B-1."

When Device A subsequently receives a frame that it needs to forward to "X", it encapsulates it with the MAC-layer "source" address of the interface on which it received the frame, and the "destination" address (again MAC-layer) from the previously signaled information (i.e.—"B-1"). When Device B receives the MAC-in-MAC encapsulated frame (using the processes previously defined in 802.1ah), it strips the outer MAC encapsulation and forwards the otherwise unmodified frame on the interface that was addressed in the received frame (again—"B-1").

Once again, as a generalization, both MAC-layer addresses "X" and "B-1" may be a combination of the 6-octet (6-byte) MAC-layer address and a VLAN ID (as defined in 802.1Q, extended in 802.1ah). Also, MAC-layer multicast destination addresses may be acquired and used in a similar fashion and Delivery would be as defined in current literature (including specifically as defined in TRILL)—i.e.—using "VLAN scoped" broadcast and multicast.

Handling of multicast, flooded unknown destination and broadcast traffic is as presently defined in 802/Ethernet related documentation. Learning of multicast address reachability is carried out in any number of existing ways, such as is documented in relevant literature for "ICMP snooping."

Note that—when end stations are connected to interfaces of 2 or more Devices (those interfaces also being used to connect said Devices)—it is necessary for proper operation of this invention (and the resulting network), for the protocol in use to include a mechanism for selecting a single device that is "designated" for forwarding frames for each a MAC-layer destination connected to the common interface.

Because it is possible—in this system 10—for a Device to receive frames that are addressed to the receiving interface (in the event that the local Device is "designated" as described above), a Device must not discard such frames.

In addition, while a higher layer may be used for the protocol in this system 10, the frames involved in signaling are potentially (or very likely) MAC-layer frames. As a result, it is possible that a MAC frame may be received by a Device where both the outer (MAC-in-MAC encapsulation) destination and the inner (post stripping) MAC-layer destination address are the same (or interface addresses of the same) local Device. As such frames will not be returned to the local Device if they are received from it, each Device must check that the inner MAC/VLAN destination corresponds to that of any of its own interfaces.

Figure 2:
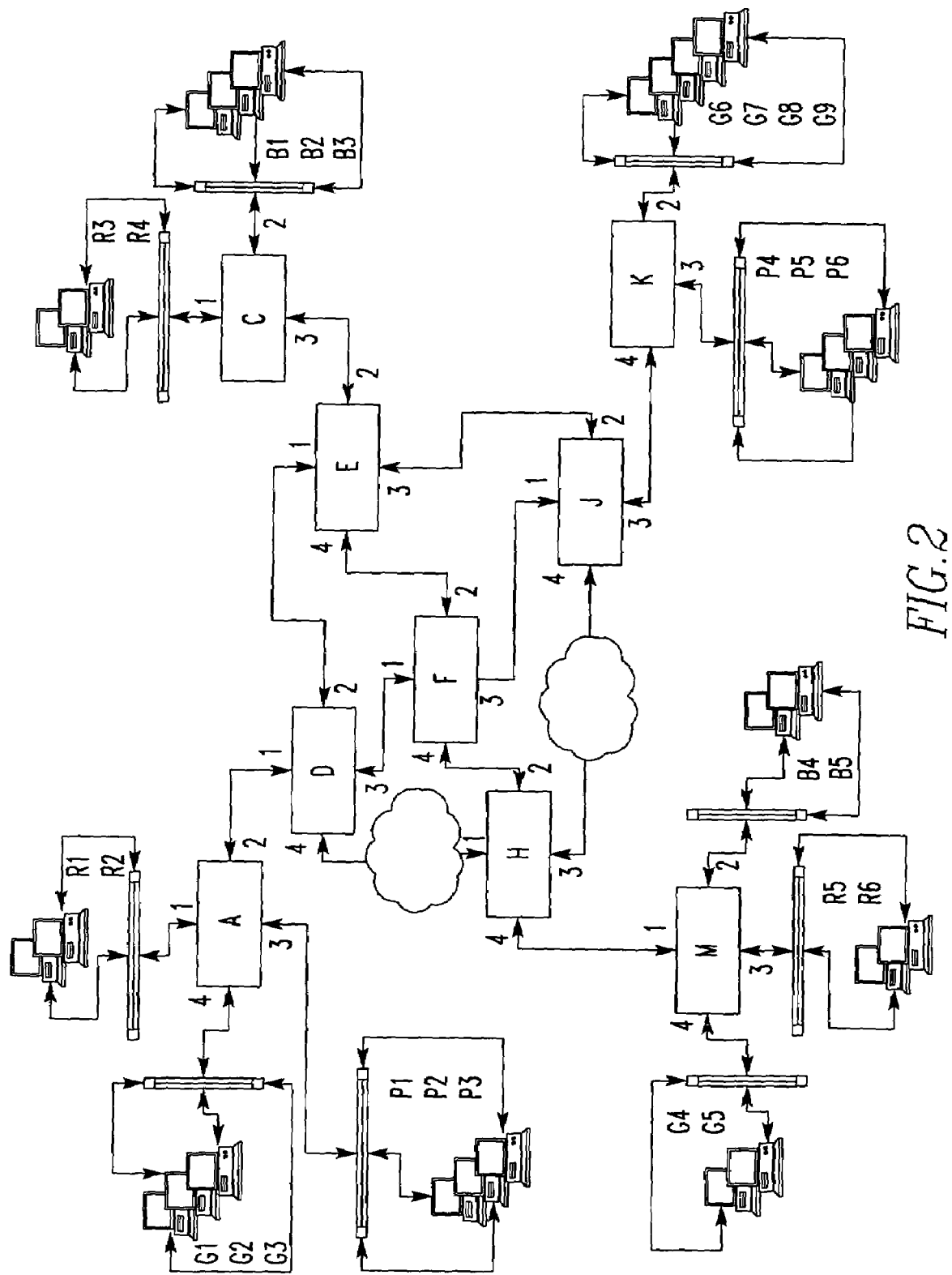
FIG. 2 is a block diagram of a network regarding the present invention.

As an example, consider a network consisting of an "ingress" device (A), and "egress" device (K) and multiple paths between the ingress and egress, as shown in FIG. 2. A desirable outcome is to have a reasonable basis for the frames received at A to take one path across the network (toward K) for some frames and a different path for other frames—if for no other reason than to make use of the multiple paths.

Further consider that one possible network topology having multiple paths between A and K is one consisting of D, E, F, H and J. Using the notation X(p)<->Y(q) to denote that device X connects (via interface p) to device Y (via interface q), D, E, F, H and J are connected to A and K as follows:

A(2)<->D(1)
D(2)<->E(1)
D(3)<->F(1)
D(4)<->H(1)
E(3)<->J(2)
E(4)<->F(2)
F(3)<->J(1)
F(4)<->H(2)
H(3)<->J(4)
J(3)<->K(4)

Further, K has two interfaces on which it may forward a frame received from A. They are interfaces 2 and 3. Let's assume that we can (without loss of generality) use the notation K-2 and K-3 to represent the MAC addresses of interfaces 2 and 3 of device K.

In order for it to be important that an intermediate device 28 may be programmed to forward differently based on the MAC address of the outer frame it is necessary that there is a multiplicity of paths to select from in making the forwarding decision. In this above case, the paths consist of (D, E, J), (D, F, J), (D, H, J)—where the notation is a simple list of the devices visited on a path, excluding the ingress and egress devices.

Let us further assume that device K has (directly or indirectly) attached to interface 2 the Ethernet end-stations G-6, G-7, G-8 and G-9, and interface 3 the Ethernet end-stations P-4, P-5 and P-6

Device A is programmed (configured, by protocol or otherwise) to encapsulate a frame headed to device K with either MAC K-2 or K-3 as the destination in the outer (tunnel) Ethernet encapsulation, when the destination in the original Ethernet header corresponds to (for example) G-7 (for K-2) or (again for example) P-5 (for K-3).

Device D is similarly programmed to forward the tunnel-encapsulated frame via device E, F, or H based on the outer destination Ethernet MAC address. D may—for example—be programmed to forward via E for the K-2 destination and via F for the K-3 destination. The choice—in this case—determines the needed programming in devices E and F, which now need to have forwarding information to ensure that tunnel-encapsulated frames received from D are forwarded appropriately toward K, in this case via J in both cases.

In current Ethernet technologies, if tunnel-encapsulation is used at all, it would use K-4 as the destination Ethernet MAC address. As a result, some other token (such as a VLAN "tag" or ID) would be required at each intermediate device 28 to effect a distinction in the path selection for individual frames. Moreover, with a multiplicity of VLANs, multiple VLAN "tags" would be grouped for forwarding entries (for example, in Multiple Spanning Tree Protocol—MSTP) and the process of forming groups is unrelated to the specific topology, or use pattern.

By using the "far-side" MAC addresses as tunnel destinations, traffic may be segregated along natural boundaries, but still be per-destination (verses per-VLAN group)—affording opportunities for controlling the path selection process to properly distribute traffic.

Several methods may be used to establish "programming" of the path selection at each intermediate station. The least effort implementation approach is to rely on configuration by the operator or by a management application. That approach is extremely vulnerable to configuration errors (particularly in the direct manual/operator configuration case).

Other methods that may be used would include direct signaling, restricted configuration and consistency negotiation (similar to spanning tree protocols), restricted "learning" (as is part of bridge 16 learning for many current VLAN bridge implementations), heuristic and/or algorithmic control applications (centralized or distributed).

As an example—what I would refer to as the "preferred embodiment"—determination of path selection information would be as defined in TRILL—with the following exceptions: o the tunnel-encapsulation Ethernet destination MAC address would in all cases be the MAC address of the interface on which the frame will be forwarded by the egress device (K, in the example), both in link-state protocol "MAC routing" advertisements and in corresponding forwarding entries at each intermediate device 28, and o where multiple shortest paths exist (as in the example network), the specific path selected will depend on the tunnel-encapsulation destination Ethernet MAC address.

In terms of FIG. 2, it is possible to remove device J from both (as a simplification), but not device D. This is because—if device A were making an analogous forwarding decision, it would not have to be based on the tunnel-encapsulation Ethernet destination MAC address, since A has direct visibility of the original encapsulation. However, if reciprocal traffic is desired, say, starting at G-7 and G-1, J must be present in FIG. 2.

Present in FIG. 2, but not discussed above, are additional devices C and M, as well as additional Ethernet end-point attachments, and device interfaces. These are necessary to show how a path selection process based on "far-side" MAC addresses is distinguishable from path selection based exclusively on VLAN "tags."

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A telecommunications system comprising:
a first device having a plurality of interfaces, with each interface having a unique MAC address, the first device using the MAC addresses for forwarding frames;
at least one bridge in communication with the first device;
a second device in communication with the first device through the bridge having a plurality of interfaces with each interface having a unique MAC address, the first device forwarding frames to a first interface of the plurality of interfaces of the second device using the unique MAC address of the first interface of the second device,
a first end station and a second end station, wherein a second interface, having a unique MAC address of the plurality of interfaces of the first device in communication with the first end station, and a second interface having a unique MAC address of the plurality of interfaces of the second device in communication with the second end station; and
a third interface of the plurality of interfaces of the first device in communication with a third interface of the plurality of interfaces of the second device through the bridge, wherein when the first device receives a frame from the first end station to be forwarded to the second end station, the first device encapsulates the frame with the unique MAC address of the second interface of the first device on which the first device received the frame from the first end station and the unique MAC address of the second interface of the second device.

2. A system as described in claim 1 wherein the first device communicates with the second end station through the second device using the unique MAC address of the second interface of the second device.

3. A system as described in claim 1 wherein when the second device receives the frame for the second end station from the first device, the second device removes the encapsulated MAC address of the first device and forwards the frame through the second interface of the second device to the second end station.

4. A system as described in claim 1 wherein path selection between the first end station and the second end station is based on far-side MAC addresses.

5. A system as described in claim 4 wherein the bridge includes intermediate devices and programming of the path selection uses either direct signaling, restricted configuration and consistency negotiation, restricted learning, heuristic and/or algorithmic control applications (centralized or distributed), or TRILL—with the following exceptions:
- the tunnel-encapsulation Ethernet destination MAC address would in all cases be the MAC address of the interface on which the frame will be forwarded by the second device, both in link-state protocol MAC routing advertisements and in corresponding forwarding entries at each intermediate device of the bridge; and
- where multiple shortest paths exist, the specific path selected will depend on the tunnel-encapsulation destination Ethernet MAC address.

6. A method for communicating comprising the steps of:
- forwarding a frame by a first device having a plurality of interfaces, with each interface having a unique MAC address, to a first interface of a plurality of interfaces of a second device, with each interface having a unique MAC address, using the unique MAC address of the first interface of the second device, the second device in communication with the first device through a bridge;
- receiving the frame at the first interface of the second device;
- receiving the frame from a first end station at a second interface having a unique MAC address of the plurality of interfaces of the first device in communication with the first end station;
- receiving the frame at a second end station through a second interface having a unique MAC address of the plurality of interfaces of the second device in communication with the second end station;
- encapsulating by the first device the frame with the unique MAC address of the second interface of the first device on which the first device received the frame from the first end station and the unique MAC address of the second interface of the second device after the first device receives the frame from the first end station to be forwarded to the second end station; and
- sending the frame by the first device to the second device through the bridge using the unique MAC address of the second interface of the second device.

7. A method as described in claim 6 wherein after the step of receiving the frame at the second end station, there are the steps of removing by the second device the encapsulated MAC address of the first device and forwarding the frame through the second interface of the second device to the second end station.

8. A method as described in claim 7 wherein before the encapsulating step, there is the step of selecting a path between the first end station and the second end station is based on far-side MAC addresses.

9. A method as described in claim 8 wherein the bridge includes intermediate devices and including the step of programming of the path selection uses either direct signaling, restricted configuration and consistency negotiation, restricted learning, heuristic and/or algorithmic control applications (centralized or distributed), or TRILL—with the following exceptions:
- the tunnel-encapsulation Ethernet destination MAC address would in all cases be the MAC address of the interface on which the frame will be forwarded by the second device, both in link-state protocol MAC routing advertisements and in corresponding forwarding entries at each intermediate device of the bridge; and
- where multiple shortest paths exist, the specific path selected will depend on the tunnel-encapsulation destination Ethernet MAC address.

* * * * *